United States Patent
Fujiwara et al.

(10) Patent No.: US 8,134,465 B2
(45) Date of Patent: Mar. 13, 2012

(54) REGISTRATION METHOD AND PLACEMENT ASSISTING APPARATUS FOR LOCATION INFORMATION TAG

(75) Inventors: Hiroko Fujiwara, Tokyo (JP); Katsuya Homma, Tokyo (JP); Hideki Shimamura, Tokyo (JP); Yoichi Sugimoto, Tokyo (JP)

(73) Assignee: PASCO Corporation, Tokyo (JP)

( * ) Notice: Subject to any disclaimer, the term of this patent is extended or adjusted under 35 U.S.C. 154(b) by 508 days.

(21) Appl. No.: 12/310,013

(22) PCT Filed: Aug. 6, 2007

(86) PCT No.: PCT/JP2007/065793
§ 371 (c)(1),
(2), (4) Date: Feb. 6, 2009

(87) PCT Pub. No.: WO2008/018609
PCT Pub. Date: Feb. 14, 2008

(65) Prior Publication Data
US 2009/0267768 A1    Oct. 29, 2009

(30) Foreign Application Priority Data
Aug. 7, 2006   (JP) .................................. 2006-214972

(51) Int. Cl.
*G08B 13/14*   (2006.01)
(52) U.S. Cl. .................................. 340/572.1; 340/568.1
(58) Field of Classification Search ................. 340/572.1
See application file for complete search history.

(56) References Cited

U.S. PATENT DOCUMENTS

| 5,920,261 | A  | * | 7/1999 | Hughes et al. | ............. 340/568.8 |
| 5,920,287 | A  | * | 7/1999 | Belcher et al. | ................ 342/450 |
| 2003/0151511 | A1 | * | 8/2003 | Duncan et al. | ............. 340/572.1 |
| 2005/0035883 | A1 | * | 2/2005 | Kameda et al. | ............ 340/995.1 |
| 2006/0022030 | A1 | * | 2/2006 | Boothroyd | .................... 235/375 |

FOREIGN PATENT DOCUMENTS

| JP | 2003-167948 | 6/2003 |
| JP | 2006-71516 | 3/2006 |

OTHER PUBLICATIONS

International Search Report.
Yamazaki, Shoichi, et al., "English Sessions, Advanced wireless communication techniques," *Proc. 2004 IEICE Comm. Soc. Conf.*, Sep. 8, 2004, Tokushima University, p. 537.

* cited by examiner

*Primary Examiner* — George Bugg
*Assistant Examiner* — Kerri McNally
(74) *Attorney, Agent, or Firm* — Finnegan, Henderson, Farabow, Garrett & Dunner, LLP (57) ABSTRACT

The invention is directed to the provision of a registration method and a placement assisting apparatus that can accurately register an object into a three-dimensional spatial database. More specifically, the invention provides a registration method for a location information tag, includes the steps of acquiring tag information of the location information tag, acquiring coordinate data that indicates scheduled placement information of the location information tag, acquiring positioning data that indicates placement location information of the location information tag, and registering the location information tag into a three-dimensional spatial database when an error between the coordinate data and the positioning data is within tolerance, and also provides a placement assisting apparatus for use in such a registration method.

7 Claims, 8 Drawing Sheets

| TAG ID | x | y | z | PLACEMENT LOCATION INFORMATION | FLOOR | DATE OF PLACEMENT | DATE OF REGISTRATION | ACCURACY LEVEL |
|---|---|---|---|---|---|---|---|---|
| XXXXXX1 | 1394556.98 | 354015.30 | 100 | TOILET | 1 | 2006/8/4 | 2006/8/4 | 1:2500 SCALE MAP |
| XXXXXX2 | 1394558.21 | 354016.83 | 1100 | TOILET | 4 | 2006/8/4 | 2006/8/4 | 1:2500 SCALE MAP |
| XXXXXX3 | 1394560.00 | 354016.02 | 115 | POSTBOX | 1 | 2006/8/4 | 2006/8/4 | GPS MANUFACTURED BY COMPANY a |
| . | . | . | . | . | . | . | . | . |

FIG.7(b)

| USER ID | PASSWORD | ORGANIZATION TO WHICH USER BELONGS | ... |
|---|---|---|---|
| user1 | XXX | DIVISION A | ... |
| . | . | . | . |

FIG.7(c)

| TAG ID | x | y | z | PLACEMENT LOCATION INFORMATION | FLOOR | TOLERANCE (m) | DATE OF CREATION | ADMINISTRATOR | TASK OPERATOR |
|---|---|---|---|---|---|---|---|---|---|
| XXXXXX1 | 1394556.98 | 354015.30 | 100 | TOILET | 1 | 0.5 | 2006/7/31 | ○ | △ |
| XXXXXX2 | 1394558.21 | 354016.83 | 1100 | TOILET | 4 | 0.5 | 2006/7/31 | ○ | △ |
| XXXXXX3 | 1394560.00 | 354016.02 | 115 | POSTBOX | 1 | 0.5 | 2006/7/31 | ○ | △ |
| . | . | . | . | . | . | . | . | . | . |
| . | . | . | . | . | . | . | . | . | . |
| . | . | . | . | . | . | . | . | . | . |

FIG.7(d)

| MESH ID | START POINT OF x | END POINT OF x | START POINT OF y | END POINT OF y | LOWER LIMIT OF z | UPPER LIMIT OF z |
|---|---|---|---|---|---|---|
| MXXXXX1 | 1394556.05 | 1394556.15 | 354401530.05 | 354401530.15 | 0.00 | 300.00 |
| MXXXXX2 | 1394556.15 | 1394556.25 | 354401530.15 | 354401530.25 | 300.00 | 600.00 |
| MXXXXX3 | 1394556.25 | 1394556.35 | 354401530.25 | 354401530.35 | 600.00 | 900.00 |
| . | . | . | . | . | . | . |
| . | . | . | . | . | . | . |
| . | . | . | . | . | . | . |

REGISTRATION METHOD AND PLACEMENT ASSISTING APPARATUS FOR LOCATION INFORMATION TAG

CROSS-REFERENCE TO RELATED APPLICATIONS

This application is a national phase application of International Application No. PCT/JP2007/065793, filed Aug. 6, 2007, and claims priority to Japanese Application No. 2006-214972, filed Aug. 7, 2006, the contents of both of which are incorporated herein by reference.

FIELD OF THE INVENTION

The present invention relates to a registration method and placement assisting apparatus for a location information tag.

BACKGROUND OF THE INVENTION

In the prior art, it is known to provide a method that defines a mesh-like pattern, composed of unit segments of a prescribed size arranged in a horizontal and vertical array, on a digital map for a car navigation system or the like in order to locate points on the map. It is also known to store the height code of a building located in a specific segment by associating it with an icon indicating the building and to display information concerning the height of the building on the map (for example, patent document 1).

There is also known a system that acquires current location information by using the GPS (Global Positioning System) positioning function incorporated in a mobile phone or the like, accesses a server, etc., on the Internet, and acquires information concerning the area around the current location based on the current location information (for example, patent document 2).

Patent document 1: Japanese Unexamined Patent Publication No. 2000-183149 (FIG. 2)

Patent document 2: Japanese Unexamined Patent Publication No. H09-319300 (FIG. 2)

SUMMARY OF THE INVENTION

While a system has been known that can show the location and height of a building or object of interest for viewing on the map, as described above, it has not been possible to spatially search through the interior space of the building. If there is data showing the inside layout of the building, since the kind of data that defines the inside layout of the building (for example, CAD data) is different from the kind of data that defines the location of the building on the map (for example, GIS (Geographic Information System) data), it has not been possible to recognize the interior and exterior of the building as a continuous space based on the data.

Figure 8A:
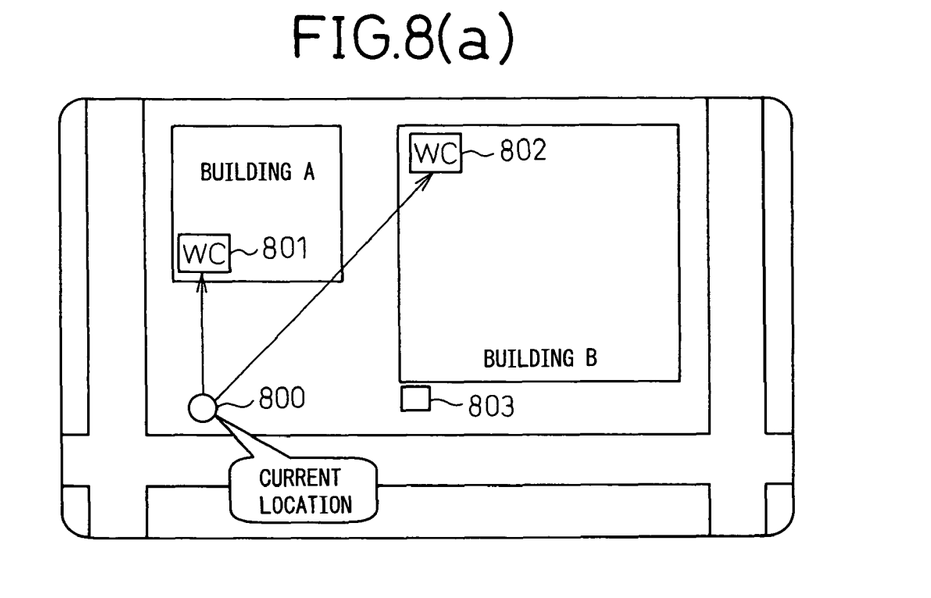
Figure 8B:
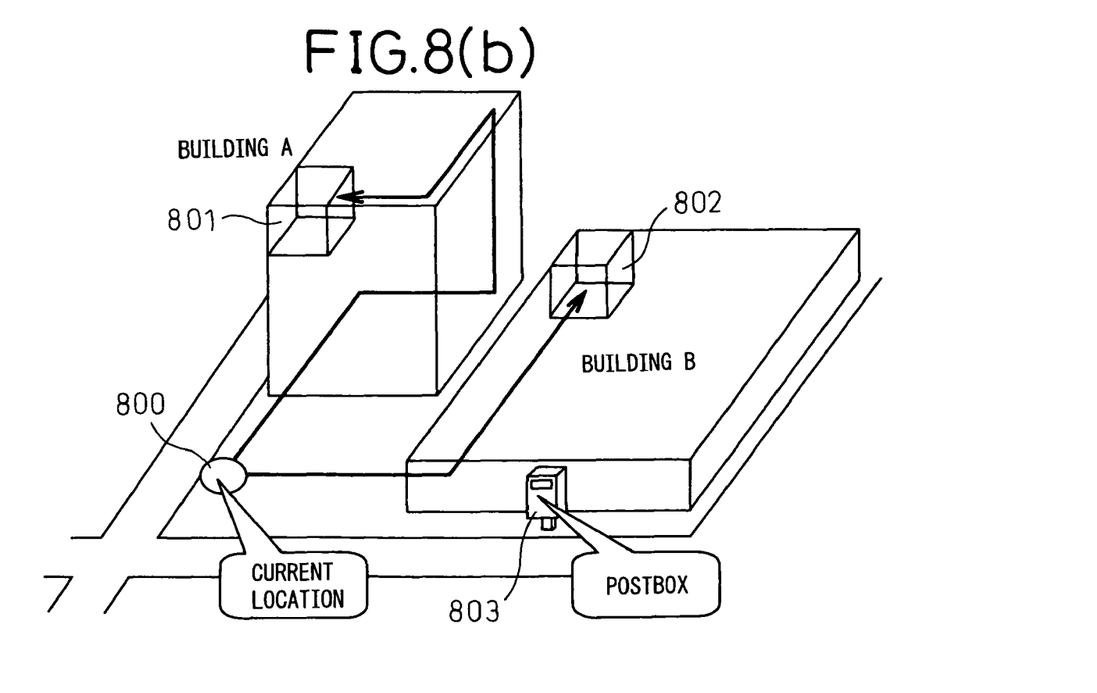

For example, if a search is made for a toilet nearest the current location on a prior art digital map (see FIG. 8(*a*)), toilet 801 located in building A is judged to be nearer than toilet 802 located in building B. However, toilet 802 is closer to the current location because, as shown in FIG. 8(*b*), toilet 802 is located on the first floor of building B, whereas toilet 801 is located on the fourth floor of building A. Such a problem has occurred because the interior and exterior of the building have not been defined using a common measure.

Accordingly, it is an object of the present invention to provide a registration method that can accurately register an object into a three-dimensional spatial database having a standardized measure that can recognize the interior and exterior of a building as a continuous space.

It is another object of the present invention to provide a placement assisting apparatus for placing a location information tag on an object to be registered in the three-dimensional spatial database.

A registration method for a location information tag according to the present invention includes the steps of acquiring tag information of the location information tag; acquiring coordinate data that indicates scheduled placement information of the location information tag, acquiring positioning data that indicates placement location information of the location information tag, and registering the location information tag into a three-dimensional spatial database when an error between the coordinate data and the positioning data is within tolerance.

Alternatively, a registration method for a location information tag according to the present invention includes the steps of, at a mobile terminal, acquiring, from a server, coordinate data that indicates scheduled placement information of the location information tag; at the mobile terminal, acquiring positioning data that indicates placement location information of the location information tag, at the mobile terminal, transmitting the placement location information and tag information of the location information tag to the server when an error between the coordinate data and the positioning data is within tolerance, and at the server, registering the location information tag into a three-dimensional spatial database, based on the placement location information and the tag information of the location information tag.

A placement assisting apparatus for a location information tag according to the present invention includes a receiver unit for receiving scheduled placement information that includes coordinate data of the location information tag; a display unit for displaying the scheduled placement information; a positioning data acquiring unit for acquiring positioning data that indicates placement location information of the location information tag; a control unit for determining whether an error between the coordinate data and the positioning data is within tolerance; and a transmitter unit for transmitting the placement location information and tag information of the location information tag when the error is within the tolerance.

According to the present invention, the location of the location information tag can be accurately registered into the three-dimensional spatial database which has a standardized measure that can recognize the interior and exterior of a building as a continuous space. Further, by using the three-dimensional spatial database in which the location information tag is accurately registered in this manner, the user that received the tag information from the location information tag in a real-world space can accurately determine the current location of the user and the location of the object of interest.

BRIEF DESCRIPTION OF THE DRAWINGS

FIG. 2(*a*) is a diagram showing one example of a real-world space, and FIG. 2(*b*) is a diagram showing one example in which the space shown in FIG. 2(*a*) is divided into meshes.

FIG. 7(*a*) is a diagram showing one example of data stored in a tag location information DB, FIG. 7(*b*) is a diagram showing one example of data stored in a user management DB, FIG. 7(*c*) is a diagram showing one example of data stored in a task information DB, and FIG. 7(*d*) is a diagram showing one example of data stored in a three-dimensional mesh DB.

FIG. 8(*a*) is a diagram showing a map according to the prior art, and FIG. 8(*b*) is a diagram showing a real-world space corresponding to FIG. 8(*a*).

DESCRIPTION OF THE PREFERRED EMBODIMENTS

A registration method for a location information tag and a placement assisting apparatus for the same will be described below with reference to the drawings.

Figure 1:
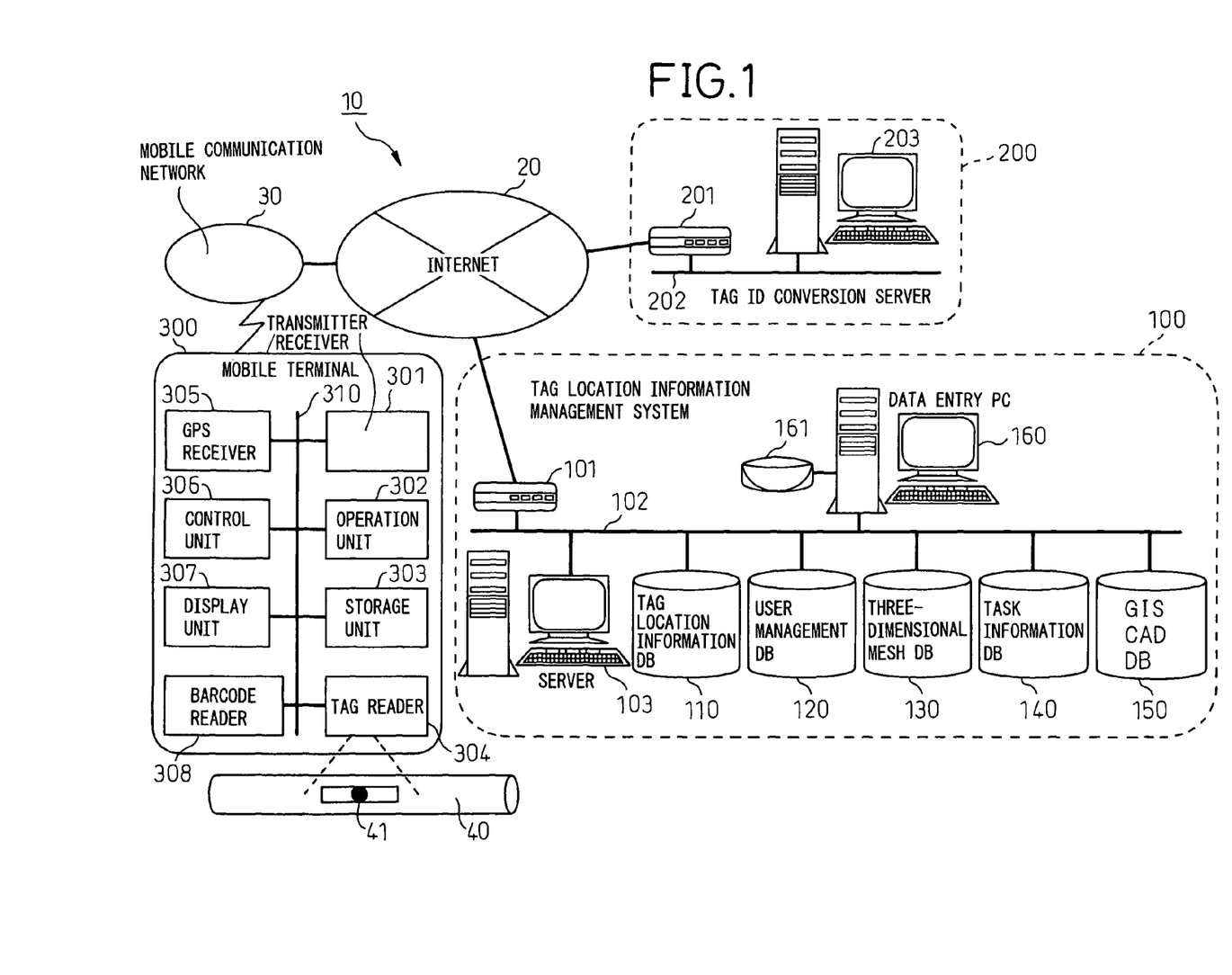
FIG. 1 is a diagram showing an overview of an entire system 10 for registering a location information tag.

FIG. 1 is a diagram showing an overview of an entire system 10 for registering a location information tag.

The system 10 is a system that performs registration, management, etc., of the information stored on the location information tag 40, and comprises a tag location information management system 100 connected to the Internet 20, a tag ID conversion server 200, and a mobile terminal 300 which functions as a placement assisting apparatus that can connect to the Internet 20 via a mobile communication network 30.

The location information tag 40 is a thin sheet with an ultra-small IC chip 41 embedded therein, and is formed from paper, plastic, or the like. The IC chip 41 has at least a wireless communication function and a ROM function, and is configured so that tag information (ID number) stored in the ROM and unique to the IC chip 41 can be transmitted when a signal of a predetermined frequency is received from an IC tag reader. The communication range is about 0.03 m to 100 m, though it varies depending on the kind of the IC chip, the kind of the antenna built into or connected to the IC chip, and the radiowave reception conditions in the surrounding area.

The tag location information management system 100 comprises a router 101, a system bus 102, a server 103, a tag location information DB 110, a user management DB 120, a three-dimensional mesh DB 130, a task information DB 140, a GIS/CAD DB 150, a data entry PC 160, a data exchange cradle 161, and etc.

The server 103 includes at least a CPU, a ROM, a RAM, a display unit, and an operation input unit, and performs the task of registering the tag information to be described later, by collaborating with the tag location information DB 110, user management DB 120, three-dimensional mesh DB 130, task information DB 140, and GIS/CAD DB 150 in accordance with a prestored program.

The data entry PC 160 includes at least a CPU, a ROM, a RAM, a display unit, and an operation input unit, and is configured to allow an operator to perform operations such as data entry to the various DBs. The data exchange cradle 161 is an interface for connecting to the mobile terminal 300. Accordingly, the data entry PC 160 is also configured so that when the mobile terminal 300 is connected to the data exchange cradle 161, various kinds of data can be taken from the mobile terminal 300 and stored in the respective DBs.

The tag ID conversion server 200 is installed outside the system in order to manage the tag information (ID numbers) of all tags that can be used in the system and their related information (such as location information and information concerning the products of the company that placed the tag). In the server, prescribed information is registered by being associated with the tag information and, by checking the tag information of a specific tag with the tag ID conversion server 200, the prescribed information registered by being associated with that tag information can be retrieved for viewing.

For example, tag information and its associated prescribed information may be stored in a content DB (not shown) provided for each information provider, and link information (for example, URL) to the content DB may be stored in the tag ID conversion server 200.

Further, the tag ID conversion server 200 need not necessarily be installed outside the system, but may be installed as an internal server within the system.

The mobile terminal 300 comprises various component elements interconnected via an internal bus 310, which include a transmitter/receiver 301 capable of transmitting and receiving data via the mobile communication network 30 and via the Internet 20, an operation unit 302 comprising buttons, a touch panel, etc., a storage unit 303 constructed from a memory, etc., a tag reader 304 for acquiring tag information from the location information tag 40, a GPS receiver 305 for receiving positioning data indicating the current location of the mobile terminal 300, a control unit 306 comprising a CPU, a ROM, a RAM, etc., a display unit 307 constructed from a liquid crystal panel or the like, and a barcode reader 308 having a CCD imager or the like capable of reading one-dimensional or two-dimensional barcode, etc. The control unit 306 is configured to be able to perform the registration task, etc., at the time of placement of the location information tag 40 in accordance with a prestored program by controlling the various component elements interconnected via the internal bus 310.

Next, a description will be given of the data structure used in the system 10 for the management of the location information tag 40.

The system 10 manages the location of the location information tag 40 by using a three-dimensional spatial database constructed by dividing each designated spatial area (for example, the area encompassing the 23 wards of Tokyo, the entire Kanto district, or all of Japan) into three-dimensional units (meshes) having continuity. The three-dimensional spatial database is implemented by a combination of the tag location information DB 110, the three-dimensional mesh DB 130, and the GIS/CAD DB 150, and is used in common for both indoor and outdoor space, and is used in common for hightwise. More specifically, the system 10 manages the location information tag 40 by using a three-dimensional spatial code attached to each mesh in the three-dimensional spatial database, i.e., an ID number capable of identifying each individual mesh.

The three-dimensional spatial database will be described in further detail with reference to FIG. 2.

Figure 2A:
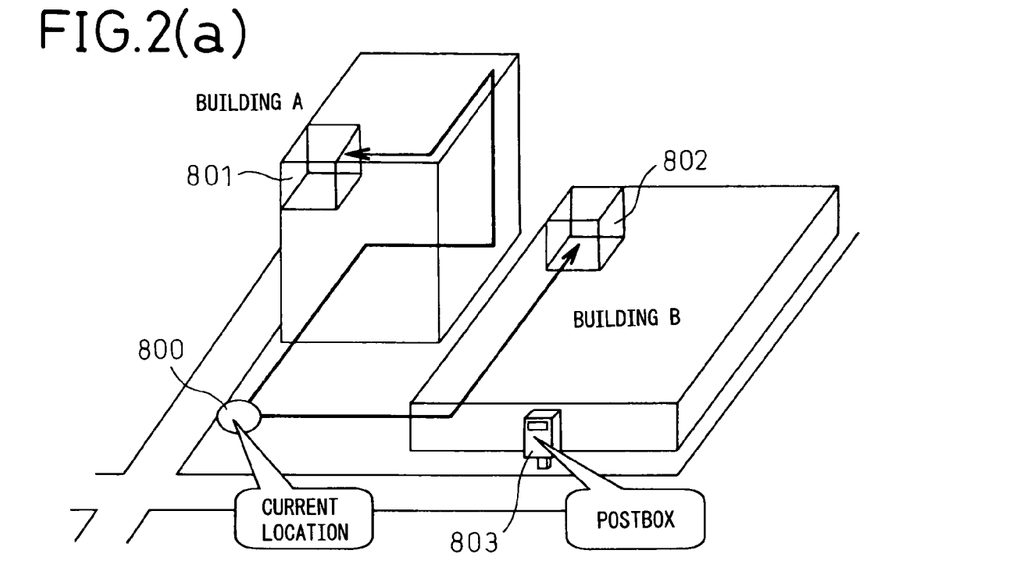
Figure 2B:
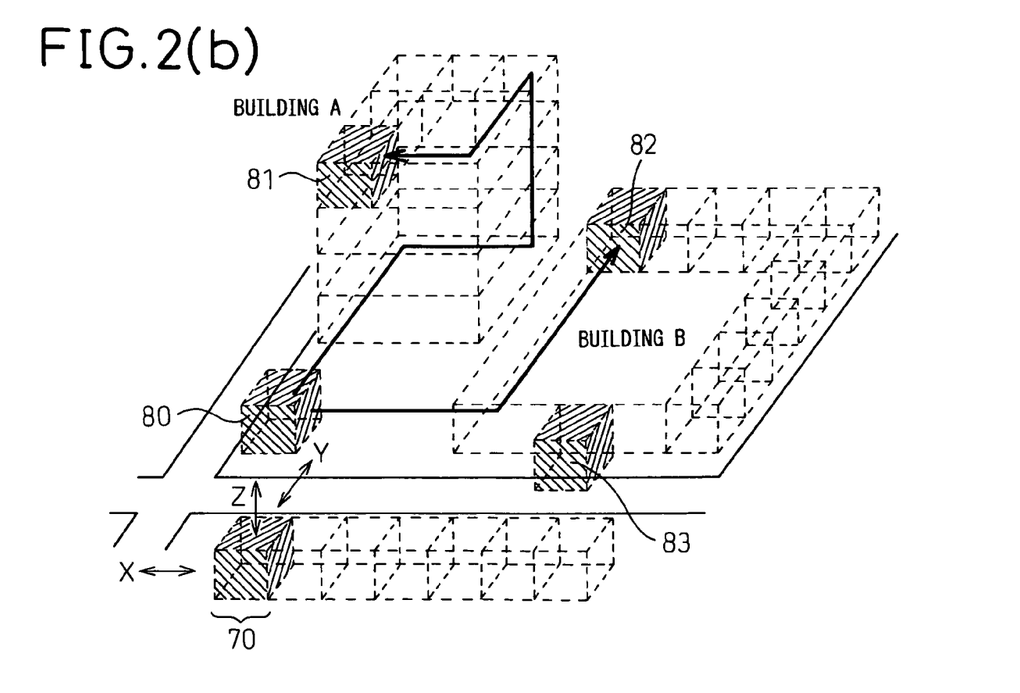

FIG. 2(*a*) is a diagram similar to FIG. 8(*b*) and shows one example of a real-world space. FIG. 2(*b*) is a diagram showing one example in which the spatial area shown in FIG. 2(*a*) is divided into meshes.

Each mesh 70 is, for example, a cube measuring 3×3×3 meters, and the entire space shown in FIG. 2(*a*) is divided in depth (y), width (x), and height (z) directions. In FIG. 2(*b*), for convenience of illustration, the entire space is not shown in meshes, but only the buildings A and B, the postbox, etc., are shown in meshes, but it is to be understood that actually the entire area is divided into meshes. The building A is represented by three meshes in the depth direction, three meshes in the width direction, and four meshes in the height direction, and the toilet 801 in the building A is located in the place represented by the mesh 81. Similarly, the building B is represented by sixth meshes in the depth direction, five meshes in the width direction, and one mesh in the height direction, and the toilet 802 in the building B is located in the place represented by the mesh 82. The current location 800 is contained in the mesh 80, and the postbox 803 is located in the place represented by the mesh 83.

It will be noted that the size of the unit mesh 70 shown in FIG. 2(*b*) is only one example, and other sizes may be utilized. Further, rather than using meshes of the same size for all areas, meshes of different sizes may be used for different areas. For example, provisions may be made to use small sized meshes (each measuring 3×3×3 meters, for example) for urban districts and larger sized meshes (each measuring 100×100×100 meters, for example) for mountain districts. Furthermore, the mesh may take other forms than a cubic form, as long as the discontinuity can be ensured.

The three-dimensional spatial database is constructed using GIS data, which primarily defines outdoor space, and CAD data, which primarily defines indoor space, and the tag information to be described later is associated with these data and stored in the tag location information DB. The GIS data and the CAD data are prestored in the GIS/CAD DB 150, and the coordinates on the GIS are associated with the location information on the CAD screen so that one can be converted to the other and vice versa.

Figure 3:
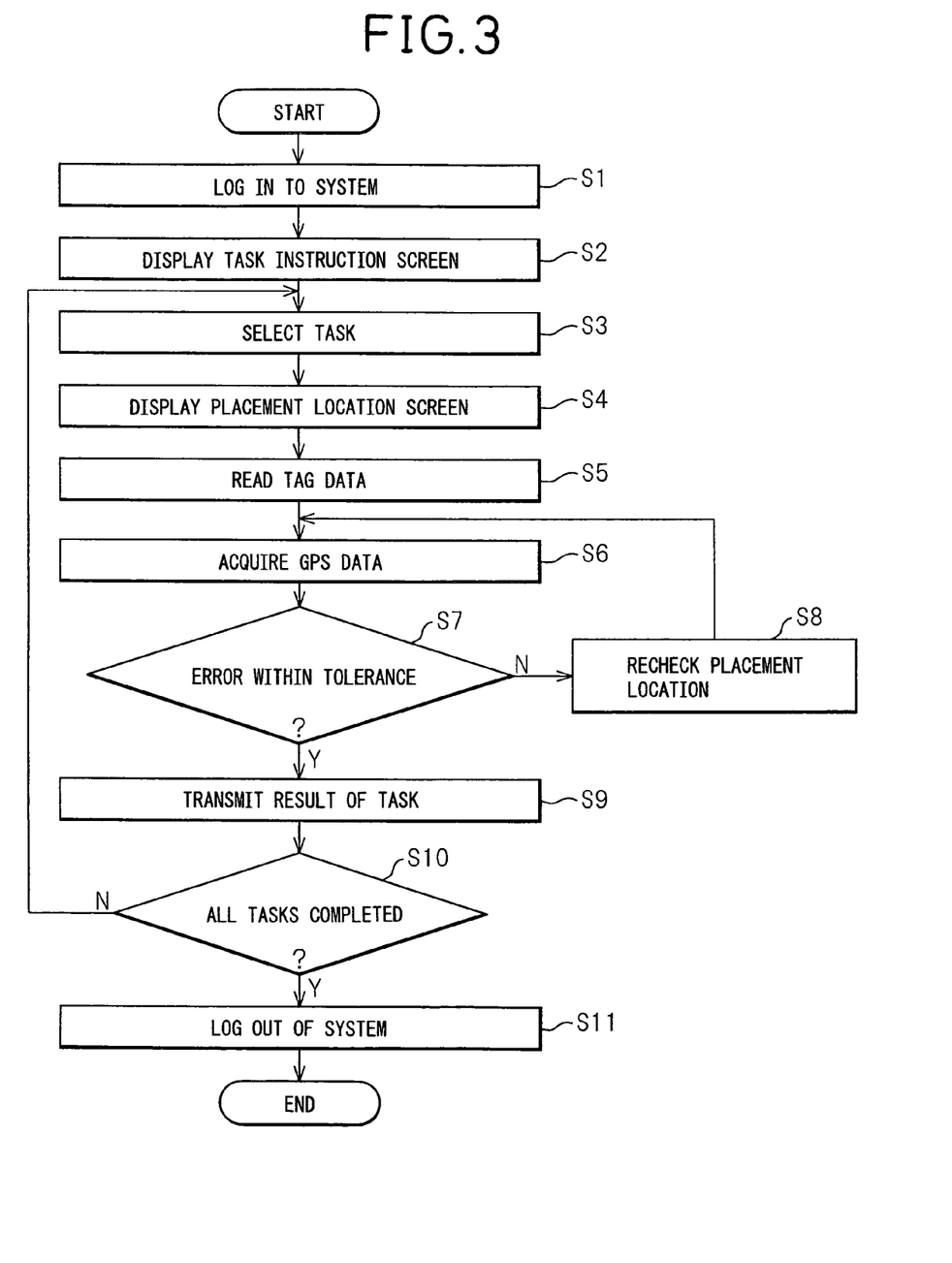
FIG. 3 is a flow diagram showing one example of an operating procedure carried out by a mobile terminal 300.

FIG. 3 is a flow diagram showing one example of an operating procedure carried out by the mobile terminal 300.

It is assumed that, prior to the initiation of the flow shown in FIG. 3, power is turned on to the mobile terminal 300, the program prestored in the control unit 306 is invoked, and the various elements of the mobile terminal 300 are ready to operate in accordance with the program. It is also assumed that the user (the person who places the location information tag) holds a plurality of prespecified location information tags 40 each having an ID number indicated thereon.

First, in response to the user's operation on the operation unit 302, the control unit 306 logs in to the tag location information management system 100 via the mobile communication network 30 and via the Internet 20 by using the transmitter/receiver 301 (S1). When logging in, the user's ID number and password entered from the operation unit 302 are transmitted to the tag location information management system 100, and the login is permitted only when the user's ID number and password match those registered in the user management DB 120 maintained in the tag location information management system 100.

Next, using the transmitter/receiver 301, the control unit 306 receives from the tag location information management system 100 a task instruction screen showing, for example, a list of placement tasks scheduled to be performed at the login date and hour by the user who logged in, and displays the screen on the display unit 307 (S2), from which the user selects a desired task by using the operation unit 302 (S3). The control unit 306 transmits the data indicating the selected task to the tag location information management system 100.

Figure 5:
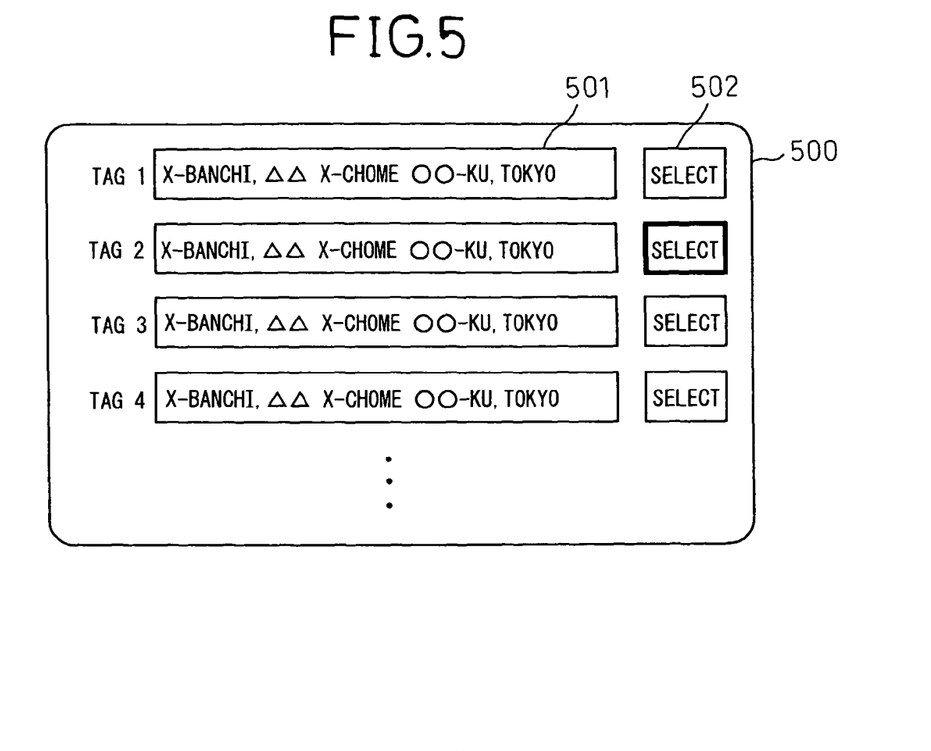
FIG. 5 is a diagram showing one example of a task instruction screen 500.

FIG. 5 is a diagram showing one example of the task instruction screen.

As shown in FIG. 5, data 501 indicating the task area and a selector button 502 used to select the task are displayed in pairs for each tag on the task instruction screen 500. FIG. 5 shows the condition in which the second tag task area has been selected by the user. In FIG. 5, the address 501 of the task area and the selector button 502 used to select the task are displayed in pairs for each tag in the form of a list on the task instruction screen 500, but the screen display is not limited to the illustrated example. For example, a map may be displayed on the background of the task instruction screen 500 in such a manner that each task area is easily identifiable with its associated tag, for example, a tag 1 to the toilet in the building A, while also displaying the selector button 502 for selecting the task associated with the tag.

Next, based on the data received from the tag location information management system 100 by using the transmitter/receiver 301, the control unit 306 displays a placement location screen 600 on the display unit 307 (S4). On the placement location screen 600, the user moves to the specified location in order to place the location information tag 40.

Figure 6:
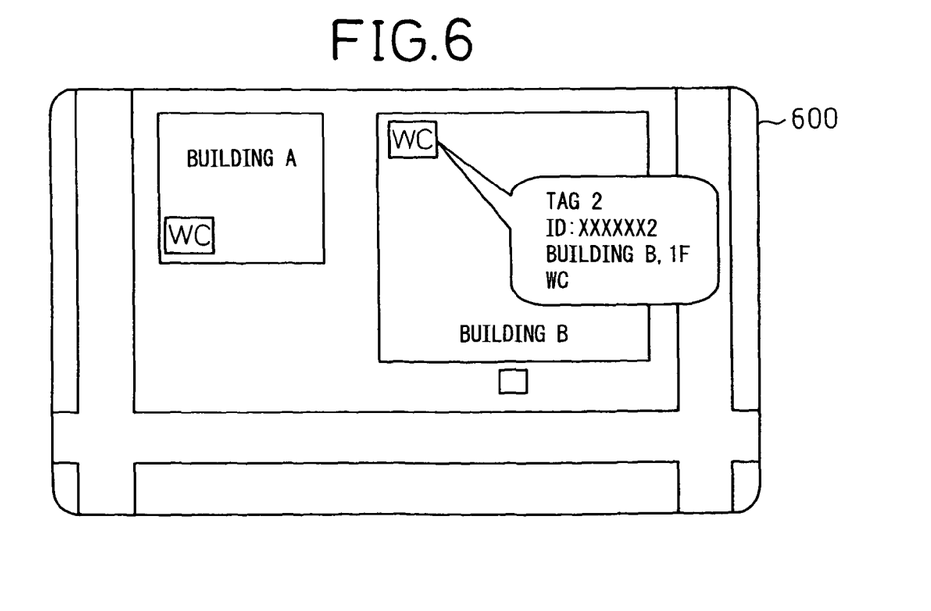
FIG. 6 is a diagram showing one example of a placement location screen.
Figure 7A:
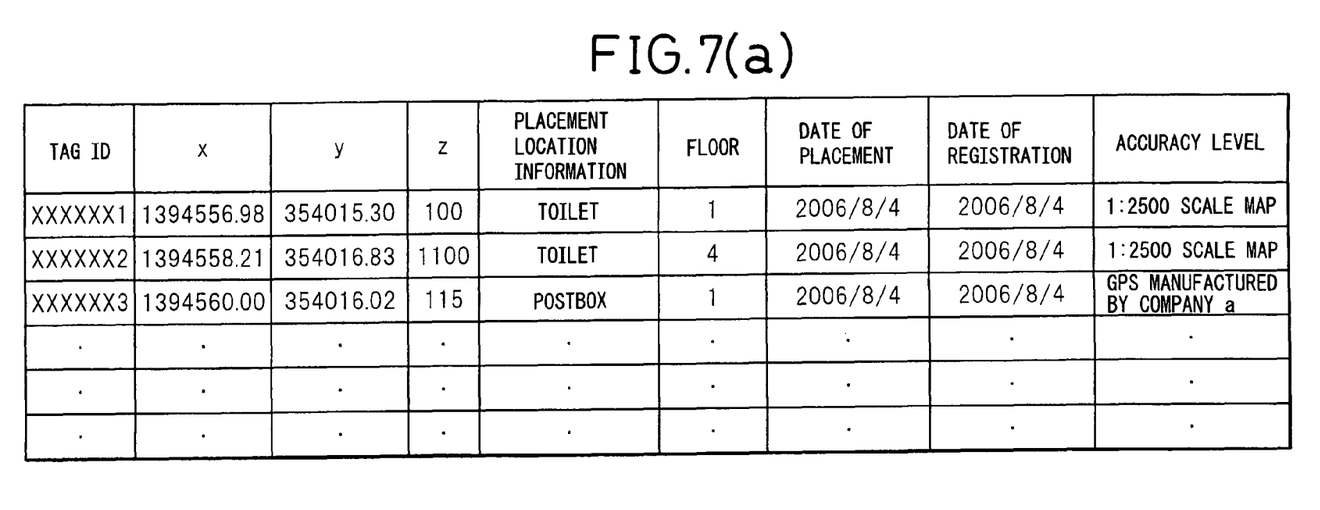
Figure 7B:
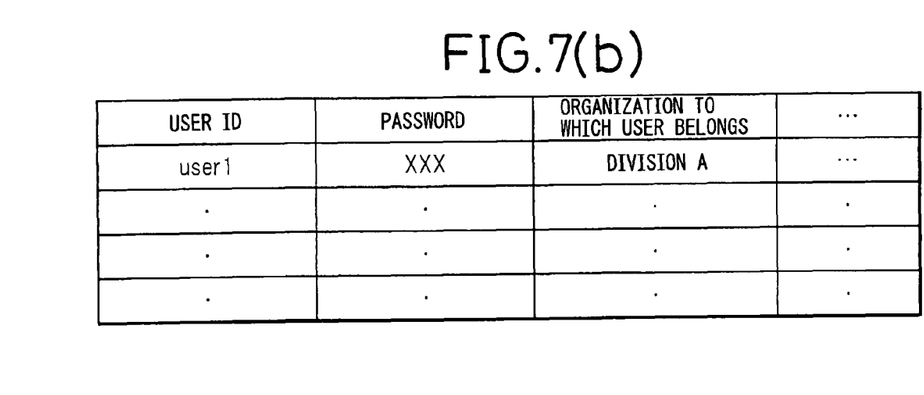
Figure 7C:
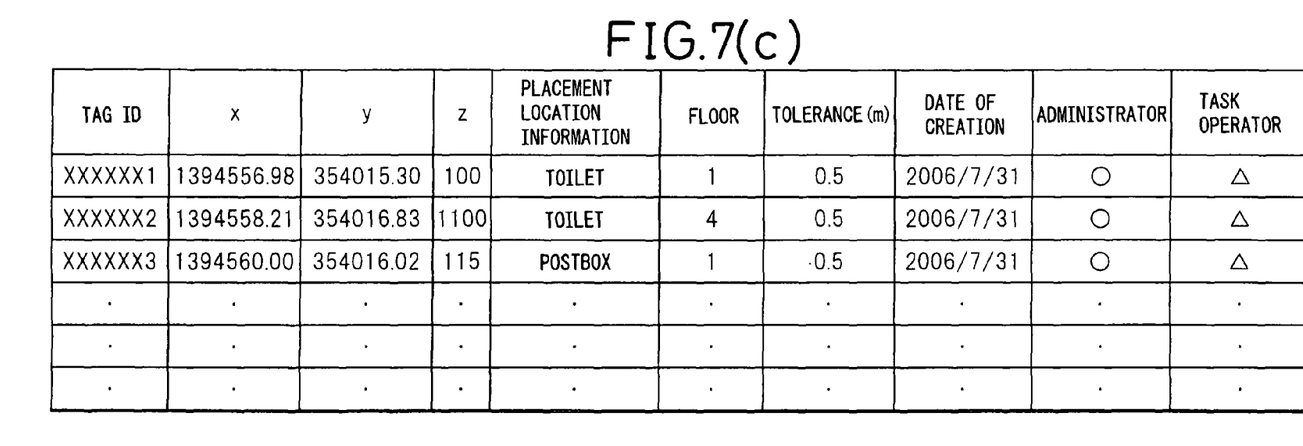
Figure 7D:
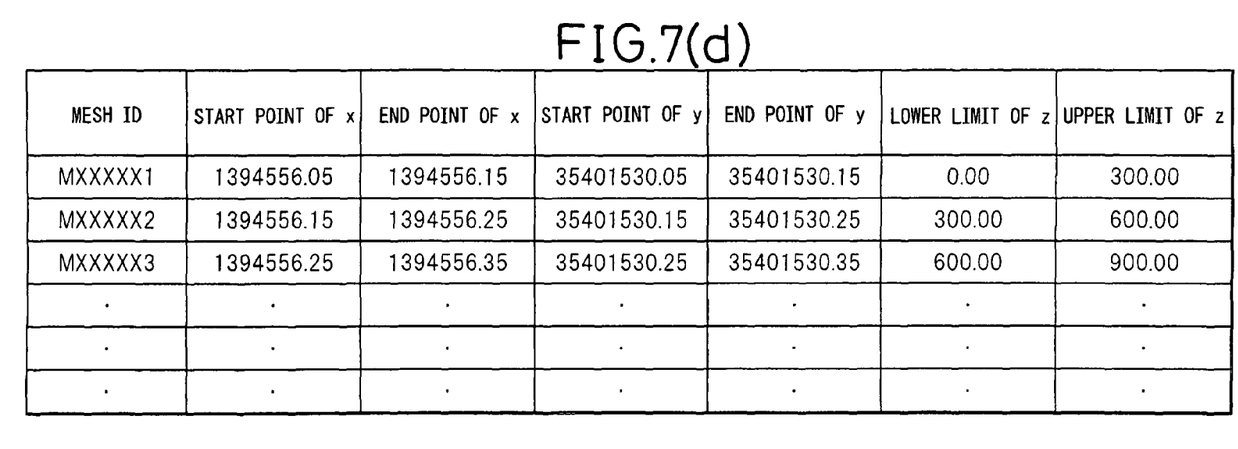

FIG. 6 is a diagram showing one example of the placement location screen 600.

As shown in FIG. 6, the placement location screen 600 indicates that a tag 2 is to be placed on the toilet in the building B. Further, the placement location screen 600 includes data specifying the tag to be placed (for example, tag 2), the ID number of the tag to be placed (for example, xxxxxx2), attribute data indicating the location where the tag is to be placed (for example, toilet), and positioning data concerning the location where the tag is to be placed (including scheduled placement data and data indicating the latitude, longitude, and height). The placement location screen 600 shown in FIG. 6 corresponds to the example shown in FIG. 2. The address and map data of each placement location necessary to be displayed on the placement location screen are acquired from the GIS/CAD DB 150 by using the tag ID as a key.

Next, the user moves to the specified location (for example, the toilet 802), and operates the operation unit 302 to place the tag 2. The user takes the tag 2 on which the prespecified ID number (xxxxxx2) is, for example, printed, and reads the tag information (at least, including the ID number) of the tag 2 by using the tag reader 304 (S5). The tag ID number thus read is temporarily stored as the ID number of the tag 2 in the storage unit 303. Since the ID number is printed on the tag 2, the tag information may not be read once again by the tag reader 304.

Next, the user activates the GPS receiver 305 by operating the operation unit 302, and acquires GPS data as the positioning data of that location (S6). The description here is given by taking the GPS data as an example of the positioning data, but use may be made of other data such as electronic reference mark data or radiowave marker data.

Next, the control unit 306 compares the positioning data acquired in S6 with the coordinate data included in the placement location screen 600 for the placement of the tag 2, and determines whether the error between them is within tolerance (S7). For example, if the error is within 50 cm, it is determined that the error is within tolerance, and the tag 2 is placed. However, if the result of the comparison shows that the error is larger than the tolerance, the control unit 306 produces an alarm indication urging the user to recheck the placement location (S8), thus instructing the user to repeat the process starting from step S6.

When the result of the comparison in S7 is within the tolerance, the control unit 306 transmits at least the ID number read by the tag reader 304 and the positioning data acquired in the above S6 to the tag location information management system 100 (S9). The server 103 can thus determine that the tag 2 has been placed at the location indicated by the positioning data on the placement location screen 600. Here, depending on the condition of the placement location, it may not be possible to take measurements using the GPS, etc. In that case, using the operation unit 302, the data is entered into the tag location information DB, based on the map of the placement location displayed on the placement location screen, placement location information carrying the attribute data indicating the placement location, and data indicating the floor.

Next, the control unit 306 determines whether all the tasks, including the placement of all the tags (for example, the tags 1 to 3) specified on the placement location screen 600, are completed or not (S10). The determination as to whether all the tasks are completed or not is made based on the prescribed operation that the user performs on the operation unit 302. If all the tasks are not completed yet, the process returns to S3 to repeat the process from S3 to S10. When all the tasks are completed, information indicating the completion of all the tasks is transmitted to the tag location information management system 100, and the control unit 306 logs out of the system 10 (S11), to complete the above sequence of operations.

Figure 4:
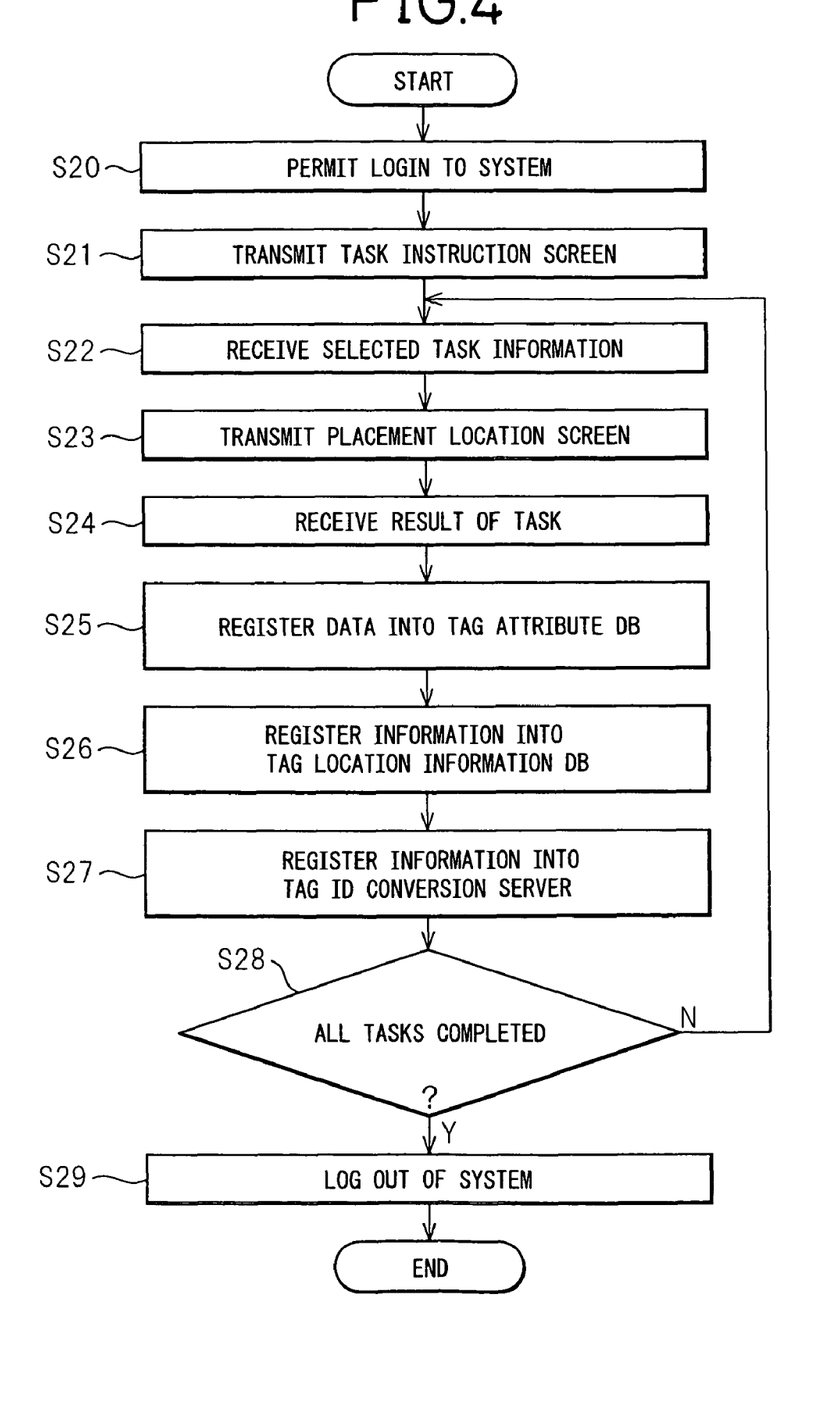
FIG. 4 is a flow diagram showing one example of an operating procedure carried out by a server 103.

FIG. 4 is a flow diagram showing one example of an operating procedure carried out by the server 103 in the tag location information management system 100.

It is assumed that, prior to the initiation of the flow shown in FIG. 4, power is turned on to the server 103, the prestored program is invoked, and the various elements of the tag location information management system 100 are ready to operate in accordance with the program. The sequence of operations shown in FIG. 4 corresponds to the sequence of operations shown in FIG. 3.

First, the server 103 permits the mobile terminal 300 to log in to the tag location information management system 100 (S20). When permitting the login, the user's ID number and password received from the mobile terminal 300 are checked to see whether they match those registered in the user management DB 120, and the login is permitted only when they match.

Next, the server 103 transmits the task instruction screen (see FIG. 5) to the mobile terminal 300 (S21). When the selected task information is received from the mobile terminal 300 (S22), the server 103 transmits the placement location screen that matches the selected task (see FIG. 6) and its accompanying data to the mobile terminal 300 (S23). It is assumed here that the task instruction screen, the placement location screen, and its accompanying data are created using the data entry PC 160 and stored in advance in the task information DB 140.

Next, when the task result information is received from the mobile terminal 300 (S24), the server 103 stores the received data in the tag location information DB 110 (S25).

FIG. 7(*a*) shows one example of data stored in the tag location information DB, FIG. 7(*b*) shows one example of data stored in the user management DB, FIG. 7(*c*) shows one example of data stored in the task information DB, and FIG. 7(*d*) shows one example of data stored in the three-dimensional mesh DB.

The tag location information DB 110 is a DB for storing information concerning the tags placed, and stores, as shown in FIG. 7(*a*), the tag ID, the x, y, and z coordinates (latitude, longitude, and height) of the tag placement location, attribute data (placement location information) indicating the tag placement location, data (floor) indicating the floor on which the tag is placed, data (date of placement) indicating the date at which the tag was placed, data (date of registration) indicating the date at which the data was registered in the DB, and accuracy level as information concerning the accuracy of the tag placement. The x and y coordinates are the geodetic coordinates, such as WGS-84, measured by the GPS, and correspond to the latitude and longitude, respectively. The z coordinate corresponds to the height. The date of placement and the date of registration are entered based on the date at which the server 103 received the result of the task concerning the placement of each particular tag. The accuracy level field carries information associated with the accuracy of the tag placement task, such as the type of the GPS apparatus used, the scale of the map, etc. As for the placement location information, the contents registered in the task information DB can be corrected by the task operator in accordance with the actual scene.

The user management DB 120 is a DB used for user authentication to control access to the various DBs, and stores, as shown in FIG. 7(*b*), the user ID, the password, the organization to which the user belongs, etc.

The task information DB 140 is a DB for storing tag placement schedules, and stores, as shown in FIG. 7(*c*), the tag ID, the x, y, and z coordinates of the scheduled tag placement location, attribute data (placement location information) indicating the tag placement location, data (floor) indicating the floor on which the tag is scheduled to be placed, data (tolerance) indicting the tolerance limit of the tag placement location, data (date of creation) indicating the date at which the placement schedule was created, the placement scheduling administrator, and the task operator. The coordinate value entries are not mandatory; if the coordinates of the scheduled tag placement location are not known in advance, the task can be scheduled so that the task will be performed based on the floor data and the map and drawing obtained from the GIS/CAD DB 150.

The three-dimensional mesh DB 130 is a DB in which the ID number for identifying each mesh is associated with coordinates, and stores, as shown in FIG. 7(*c*), the ID number of each mesh and the start and end points or upper and lower limits of the x, y, and z coordinates associated with it. The rule is set such that when the position is located on a boundary between meshes, for example, the mesh having the smaller coordinate value is assigned. These pieces of information are stored in advance by using the data entry PC 160. Further, if information concerning restrictions to passing such a wall and a passage is stored as an attribute for each mesh, such information can be used when spatially searching through the interior space of a building.

Next, the server 103 registers the information concerning the placed tag into the tag location information DB 110 in order to associate it with the three-dimensional spatial code in the three-dimensional spatial database (S26). In this way, the tags 1, 2, and 3 are registered by being associated with the meshes 81, 82, and 83, respectively, as shown, for example, in FIG. 2(*b*).

Next, the server 103 accesses the tag ID conversion server 200, and registers the information concerning the placed tag (information registered, for example, in the tag location information DB 110) into the DB managed by the tag ID conversion server 200 (S27). In this way, the information concerning every tag thus placed is made public to any user that can access the tag ID conversion server.

Then, the server 103 determines whether all the tasks of the mobile terminal 300 are completed or not (S28). The determination as to whether all the tasks are completed or not is made based on the data received from the mobile terminal 300. If all the tasks are not completed yet, the process returns to S22 to repeat the process from S22 to S28. When all the tasks are completed, the mobile terminal 300 logs out of tag location information management system (S29), to complete the above sequence of operations.

As described above, by placing each tag in accordance with the sequence of operations shown in FIGS. 3 and 4, each location information tag having a predetermined ID number is accurately registered into the three-dimensional spatial database by being associated with the three-dimensional spatial code in the data space. By using the three-dimensional spatial database in which the location information tag is accurately registered in this manner, the user that received the tag information from the location information tag in a real-world space can accurately determine the current location of the user and the location of the object of interest.

Further, if a barcode corresponding to the tag ID number is printed or attached to the location information tag 40, the tag ID number can be acquired by using the barcode reader 308 of the mobile terminal 300, not the tag reader 304.

In the above example, after completing the placement of each location information tag, the location information tag is registered by performing communication with the server 103, but instead, after completing the placement of all the scheduled location information tags, the location information tags may be registered collectively. In that case, data concerning all the placed location information tags are temporarily stored in the storage unit 303 in the mobile terminal 300, after which the mobile terminal 300 is connected to the data exchange cradle 161, and the temporarily stored data are transmitted to the server 103 via the data entry PC 160.

In the above example the method is described in which the location information tag having a predetermined ID number is placed in a predetermined placement location (see FIGS. 3 and 4). However, even if each location information tag bears an ID number attached by means of printing or the like, there are cases where the task of discriminating each individual tag can become extremely laborious. This is especially the case when placing a large number of location information tags (for example, more than 100 tags) at a time. To address this, only the placement location data (positioning data) may be determined in advance as the data accompanying the placement location screen 600, and the ID numbers of the location information tags may not be determined in advance. In other words, the user moves to each predetermined placement location, and places a tag randomly selected on the spot. In this case, the user need only acquire the tag information (including the ID number) of the selected location information tag by using the tag reader 304, and the task can thus be made simpler than when searching for the desired tag from among a large number of location information tags.

The invention claimed is:

1. A registration method for a location information tag in a system in which a mobile terminal and a server is connected via a network, comprising the steps of:
    at said mobile terminal, acquiring, from said server, coordinate data that indicates scheduled placement information of said location information tag;
    at said mobile terminal, acquiring positioning data that indicates placement location information of said location information tag;
    at said mobile terminal, transmitting said placement location information and tag information of said location information tag to said server when an error between said coordinate data and said positioning data is within tolerance; and
    at said server, registering said location information tag into a three-dimensional spatial database, based on said placement location information and said tag information of said location information tag.

2. The registration method for the location information tag according to claim 1, wherein said three-dimensional spatial database contains said positioning data and a spatial code for identifying a three-dimensional unit created by dividing a spatial area.

3. The registration method for the location information tag according to claim 1, wherein said tag information of said location information tag is acquired directly from said location information tag by a tag reader provided in said mobile terminal.

4. The registration method for the location information tag according to claim 1, wherein said server has a database for prestoring said tag information of said location information tag, and
    said tag information of said location information tag is transmitted from said server to said mobile terminal.

5. A placement assisting apparatus for a location information tag, comprising:
    a receiver receiving scheduled placement information that includes coordinate data of said location information tag;
    a display unit displaying said scheduled placement information;
    a positioning data acquisition unit acquiring positioning data that indicates placement location information of said location information tag;
    a control unit determining whether an error between said coordinate data and said positioning data is within tolerance; and
    a transmitter unit transmitting said placement location information and tag information of said location information tag when said error is within said tolerance.

6. The placement assisting apparatus for the location information tag according to claim 5, further comprising a tag information reading unit acquiring said tag information of said location information tag.

7. The placement assisting apparatus for the location information tag according to claim 5, wherein said receiver unit receives said tag information of said location information tag.

* * * * *